United States Patent Office 3,580,715
Patented May 25, 1971

3,580,715
COATED FERTILIZER
Joseph T. Dilday, North Little Rock, Ark., assignor to Olin Corporation
No Drawing. Filed Apr. 16, 1969, Ser. No. 816,808
Int. Cl. C05c 9/00
U.S. Cl. 71—28       7 Claims

ABSTRACT OF THE DISCLOSURE

Tenacious coatings of fertilizer supplements are applied to granular high analysis fertilizers, by adding, in order, minor amounts of mineral oil and of aqueous calcium lignosulfonate and then substantial amounts of fertilizer supplements, maintaining the granules in motion during and after each addition until the added material uniformly coats the granules.

---

This invention relates to coated high analysis fertilizer granules and to a process for their production. More particularly, it relates to tenacious coatings of fertilizer supplements on granules of high analysis fertilizers.

Granular mixed high analysis fertilizers are commercially available ammonium phosphates, ammonium sulfate, urea and mixtures thereof, with or without potassium salts, particularly potassium chloride. Analyses of these fertilizer materials is commonly expressed as the content of N, $P_2O_5$, $K_2O$ and referred to as N-P-K. Examples of commercial granular high analysis fertilizers include 6-24-24, 11-48-0, 13-13-13, 16-16-16, 18-46-0 and 30-10-10. Commercial urea similarly is 46-0-0. All of these materials are sized to pass 6 mesh and to be substantially all retained on 40 mesh U.S. Standard screens. These materials are referred to in this specification and claims as high analysis fertilizers.

Fertilizer supplements are desirably provided for special purposes which can be accomplished by one application to the soil by combining the supplement with the fertilizer. It is especially advantageous to combine with high analysis fertilizers one or more fertilizer supplements selected from the group consisting of sulfur, micronutrients and pesticides. However, fertilizer supplements are finely divided materials and difficulties arise in combining these supplements with the granules to provide products which are of uniform composition and which remain of uniform composition in handling, shipping and use.

Elemental sulfur is commonly employed in mixtures with fertilizers especially for use in western United States where soils are frequently deficient in this plant nutrient. Sulfur also serves as a fungicide, soil conditioner, neutralizes alkalinity and solubilizes other nutrients. Sulfur applied as a coating on fertilizer particles reduces their caking tendency and it reduces the rate of release of very soluble fertilizers, for example, urea, to the soil. In this way, more of these soluble materials are absorbed and utilized by the crop.

Micronutrient compounds are also fertilizer supplements advantageously coated on granular fertilizers. The micronutrient elements are usually considered to be iron, manganese, molybdenum, boron, copper, zinc and chlorine. These elements are usually supplied as salts or oxides containing the elements in the cations or anions. Suitable salts are, for example, sulfates, nitrates, chlorides, molybdates or borates. Zinc is frequently supplied as the oxide.

Pesticides are also fertilizer supplements which are advantageously incorporated with granular fertilizers. They serve to control fungi, nematodes, insects and other pests with the application of granular fertilizers to feed the crops. Examples of suitable pesticides includes pentachloronitrobenzene, 1-naphthyl N-methylcarbamate, zinc ethylene bis- dithiocarbamate, phosphate and thiophosphate esters, e.g., O,O-dimethyl S-(1,2-dicarbethoxyethyl) phosphorodithioate among others.

The fertilizer supplements are generally available in finely divided form or are advantageously finely ground so that most passes 200 mesh U.S. Standard screens. The preparation of satisfactory coatings of fertilizer supplements on granular fertilizer compositions must overcome the difficulty that the powdered supplements do not adhere tightly to fertilizer particles. The supplements, simply blended with the fertilizer particles, tend to separate and settle in spite of thorough mixing. Separation and settling are aggravated by shipping and handling.

Various binders are known to the art to improve the adherence of finely divided supplements to granular fertilizers. U.S. Patent No. 3,295,950 shows oils and waxes, No. 3,313,613 shows urea-formaldehyde resins, No. 3,313,615 shows gilsonite and No. 3,353,949 shows sugars and alkali metal lignosulfonates as binders. U.S. Patent 3,100,698 describes melt-blending of sulfur and urea. However, this requires specialized equipment and greater costs.

However, there is still a need in the art for an improved method of coating granular fertilizers with fertilizer supplements to provide coated fertilizers which are uniformly coated, free-flowing, stable in storage and use and which provide immediate availability of the supplements for leaching by the soil while still retarding the dissolution and loss of soluble fertilizer components.

According to this invention, novel compositions comprising granular fertilizers having a tightly adherent coating of fertilizer supplement are prepared by:

(1) Maintaining the granules in motion while adding from 0.5 to 5% by weight, based on the total of fertilizer and supplement, of mineral oil of lubricating viscosity and maintaining said motion until said oil uniformly coats said granules;

(2) Adding aqueous calcium lignosulfonate solution containing from 20 to 70% of calcium lignosulfonate solids to provide from 0.1 to 5% by weight, based on the total of fertilizer and supplement of said calcium lignosulfonate solids and maintaining said motion until said lignosulfonate uniformly coats said particles; and (3) Adding from 1 to 20% by weight, based on the total of said fertilizer and supplement, of fertilizer supplement passing 200 mesh U.S. Standard screens and maintaining said motion until said supplement uniformly coats said particles.

In the process of this invention, the order of addition of the particular materials is critical to successful accomplishment. When the process is practiced using the materials specified, outstanding products are obtained. When the lignosulfonate is added prior to the oil, the sticky, viscous lignosulfonate is substantially unspreadable and the particles agglomerate in large aggregates. The particles are not uniformly coated and the resulting bald spots cause serious caking in storage. For this reason, addition of the oil prior to the calcium lignosulfonate is necessary to obtain uniform spreading of the lignosulfonate and to produce a uniform coating of supplement. Omission of the oil fails to achieve the products of the process of this invention. Oil alone as binder is unsatisfactory. The oil gradually transfers from the finely divided supplement and penetrates the granules of fertilizer, loosening the supplement particles which then separate and segregate from the larger granules during handling. Such loosening does not occur using both oil and calcium lignosulfonate according to the present invention. Addition of the lignosulfonate to a preformed dry mixture of supplement and granules of fertilizer similarly results in the formation of unmanageable lumps and non-uniform coating of the granules. The alkali metal or ammonium lignosulfonates are not equivalents of the calcium lignosulfonate used in this invention and do not have the binding ability of the calcium lignosulfonate to produce uniformly coated particles.

Practice of the process of this invention as described results in substantially complete adherence of the supplement to the fertilizer granules without loss and without the necessity of separating the coated product from nonadherent particles. The fertilizer granules are uniformly coated without any bald spots and the coating has outstanding resistance to attrition and separation from the fertilizer granules during normal or even unusual handling and/or shipment. In storage, the coated granules are substantially non-caking, even under extended storage at elevated temperatures under extreme pressures due to high stacking of bags.

The process of this invention is carried out at ambient temperatures and no heating or cooling is required. Mechanical agitation tends to add minor amounts of heat to the compositions but this is negligible and is not an essential part of the invention.

The products of this invention when distributed on the soil provide the fertilizing benefit of their N-P-K content together with acidification of the soil when sulfur is the supplement, providing necessary micronutrients when they are incorporated and pesticidal action when the supplement is a pesticide in whole or in part.

Supplements suitable for use in the process of this invention must be fine particles passing 200 mesh U.S. Standard screens. For most advantageous results, the supplements are even finer. "Cloud" brand sulfur, which is commercially available and has 95% or more passing 325 mesh, is particularly suitable. The micronutrients are generally available in finely divided form. They are advantageously incorporated with sulfur or woth pesticides in the coating formed according to this invention. They are added at the time the sulfur or pesticide is added or they are suitably mixed with the sulfur before adding.

The amount of supplement is suitably from 1 to 20% of the total composition. Sulfur alone suitably forms the coating in these amounts. Micronutrients and pesticides are preferably used in lesser amounts from about 0.1 to 5% of the compositions.

Mineral oil of lubricating viscosity in the present specification and claims means oils having a viscosity from about 400 to 500 S.S.U. at 100° F. and include, for example, No. 2 diesel fuel oil, light and medium viscosity lubricating oils, neutral oils and used motor oils. Used motor oil is available cheaply in large quantities and is especially advantageous. Its use helps to ameliorate a disposal problem. The amount of oil, based on the total of fertilizer and sulfur is suitably from about 0.5 to 5%. Less than 0.5% may be insufficient to coat the granules and more than 5% is unnecessary and may strike through paper bags in which the product is stored.

The calcium lignosulfonate used in the process of this invention is a by-product of the lime process of wood pulping and is more particularly described as water-soluble, anionic, surface-active derivatives of lignin containing wood sugar derivatives. Norlig 41 is one such commercial product. Also available commercially are alkali metal and ammonium lignosulfonates but these are distinctly inferior to calcium lignosulfonate in binding ability and are not equivalent in the process of this invention. The calcium lignosulfonate is used in the form of aqueous solutions containing from about 20 to 70% of calcium lignosulfonate. Commercial products usually contain 25%, 50%, 55%, or 60% solids. According to the process to the process of this invention, the aqueous calcium lignosulfonate is added to the mixture of oil and fertilizer particles in amounts sufficient to provide from 0.1 to 5% of calcium lignosulfonate solids based on the total of fertilizer and supplement. Less than 0.1% may be insufficient for complete adherence of larger amounts of sulfur and more than 5% is unnecessary and may result in a somewhat sticky, less desirable product.

EXAMPLE I

Twenty-five pounds of urea prills were coated with 10% sulfur. The prills were tumbled in a cement mixer while adding 1%, based on the sulfur and urea of used motor oil. After tumbling for 1½ minutes, 1% of a 50% aqueous calcium lignosulfonate was added and tumbling was continued for one minute. Ten percent of "Cloud" sulfur, 98% passing 325 mesh, was added with additional tumbling for two minutes. All of the sulfur adhered to the prills and on screening less than 1% of the sulfur was shaken from the prills. Applied to the soil at rates of 200 and 400 pounds per acre, these coated prills fertilized crops of cotton, corn, wheat and soybeans and served to acidify the soil.

Repeating Example I using sodium lignosulfonate or ammonium lignosulfonate for the calcium lignosulfonate, the coating was uneven and mottled with bare spots.

Repeating Example I omitting the oil, the prills agglomerated badly, were incompletely coated and caked badly.

When the procedure of Example 1 was varied by omitting the oil and by mixing the sulfur with the prills, then adding sodium lignosulfonate, mottled prills with a high proportion of bare spots were produced and they caked badly.

EXAMPLE II

A larger batch of sulfur coated urea prills was prepared by the procedure described in Example I using the quantities:

| | Pounds |
|---|---|
| Urea prills | 1760 |
| Used motor oil | 20 |
| Calcium lignosulfonate (50%) | 20 |
| "Cloud" sulfur | 200 |
| Total | 2000 |

The product retained substantially all of the sulfur. Analysis showed 40.5% nitrogen and 10% sulfur. The prills were bagged and the bags were stacked 10 deep in warehouse storage for 3 months. When opened, even the bottom bags were completely free-flowing.

EXAMPLE III

Granular "Ammo-Phos," a commercial fertilizer mixture nominally analyzing 6-24-24 (for nitrogen, $P_2O_5$ and $K_2O$) was coated with 5% sulfur by the procedure shown in Example 1 using the quantities.

| | Pounds |
|---|---|
| 6-24-24 | 1860 |
| Used motor oil | 20 |
| Calcium lignosulfonate (50%) | 20 |
| "Cloud" sulfur | 100 |
| Total | 2000 |

Substantially all of the sulfur was tightly adherent on the fertilizer particles and the product analyzed 5% S. Actual analysis for N-P-K was 5.6-22.3-22.3%. The product was substantially non-caking in storage.

EXAMPLE IV

Granular "Ammo-Phos," a commercial fertilizer mixture nominally analyzing 13-13-13 (for nitrogen, $P_2O_5$ and $K_2O$) was coated with 15.5% of pentachloronitrobenzene by the procedure shown in Example 1, using the following percentages:

| | Percent |
|---|---|
| 13-13-13 | 75.3 |
| Used motor oil | 3.0 |
| Calcium lignosulfonate (50%) | 1.0 |
| "Terraclor 75W" | 20.7 |
| Total | 100.0 |

The "Terraclor 75W" is a wettable powder containing 75% of pentachloronitrobenzene. All the "Terraclor" was tightly adherent on the fertilizer particles. Actual analysis for N–P–K was 9.8–9.8–9.8. The product was substantially noncaking in storage.

EXAMPLE V

Granular "Ammo-Phos," a commercial fertilizer mixture nominally analyzing 13–13–13 (for nitrogen, $P_2O_5$ and $K_2O$) was coated with 10% of pentachloronitrobenzene and 4% naphthyl N-methylcarbamate by the procedure shown in Example I, using the following percentages:

|  | Percent |
|---|---|
| 13–13–13 | 77.7 |
| Used motor oil | 3.0 |
| Calcium lignosulfonate (50%) | 1.0 |
| "Terraclor 75W" | 13.3 |
| "Sevin 80W" | 5.0 |
| Total | 100.0 |

The "Sevin 80W" is a wettable powder containing 80% of 1-naphthyl N-methylcarbamate. All the "Terraclor" and "Sevin" were tightly adherent on the fertilizer particles. Actual analysis for N–P–K was 10.1–10.1–10.1. The product was substantially non-caking in storage.

What is claimed is:

1. In a process for forming a tightly adherent coating of a fertilizer supplement on granules of high analysis fertilizer, the improvement of:
    (1) Maintaining said granules in motion while adding from 0.5 to 5% by weight, based on the total of fertilizer and supplement, of mineral oil of lubricating viscosity and maintaining said motion until said oil uniformly coats said granules;
    (2) Adding aqueous calcium lignosulfonate solution containing from 20 to 70% of calcium lignosulfonate solids to provide from 0.1 to 5% by weight, based on the total of fertilizer and supplement of said calcium lignosulfonate solids and maintaining said motion until said lignosulfonate uniformly coats said particles; and
    (3) Adding from 1 to 20% by weight, based on the total of said fertilizer and supplement, of fertilizer supplement passing 200 mesh U.S. Standard screens and maintaining said motion until said supplement uniformly coats said particles.

2. Process as claimed in claim 1 in which said oil has a viscosity from about 400 to 500 S.S.U. at 100° F.

3. Process as claimed in claim 2 in which said oil is used motor oil.

4. Process as claimed in claim 1 in which said lignosulfonate solution contains about 50% calcium lignosulfonate solids.

5. Process as claimed in claim 1 in which said supplement is sulfur and said sulfur passes 325 mesh U.S. Standard screens.

6. Process as claimed in claim 1 in which 95% of said granules pass 6 mesh and 80% or more are retained on 20 mesh U.S. Standard screens.

7. Process as claimed in claim 5 in which said granules are urea prills.

References Cited

UNITED STATES PATENTS

| 3,295,950 | 1/1967 | Blouin et al. | 71—28X |
| 3,313,613 | 4/1967 | Green | 71—28 |
| 3,353,949 | 11/1967 | Nau | 71—1X |

SAMIH N. ZAHARNA, Primary Examiner

B. H. LEVENSON, Assistant Examiner

U.S. Cl. X.R.

71—64